Sept. 17, 1946.  W. E. DEMPSEY  2,407,653
GRAIN CLEANER
Filed Feb. 12, 1944  2 Sheets-Sheet 1
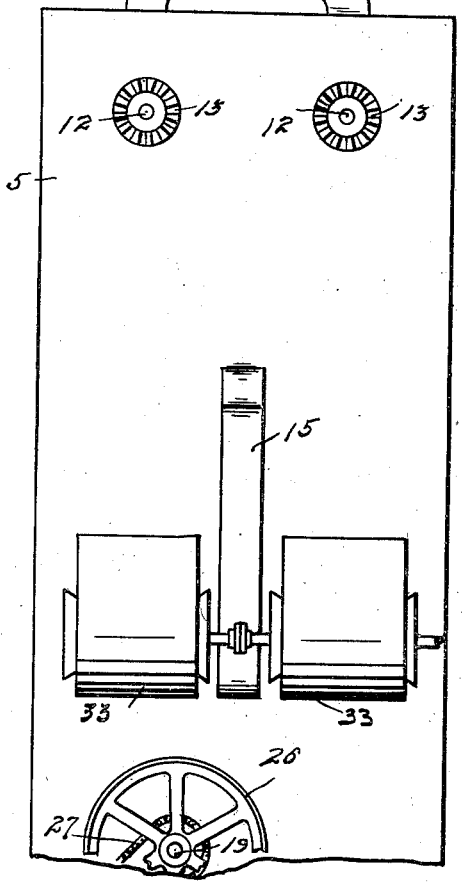
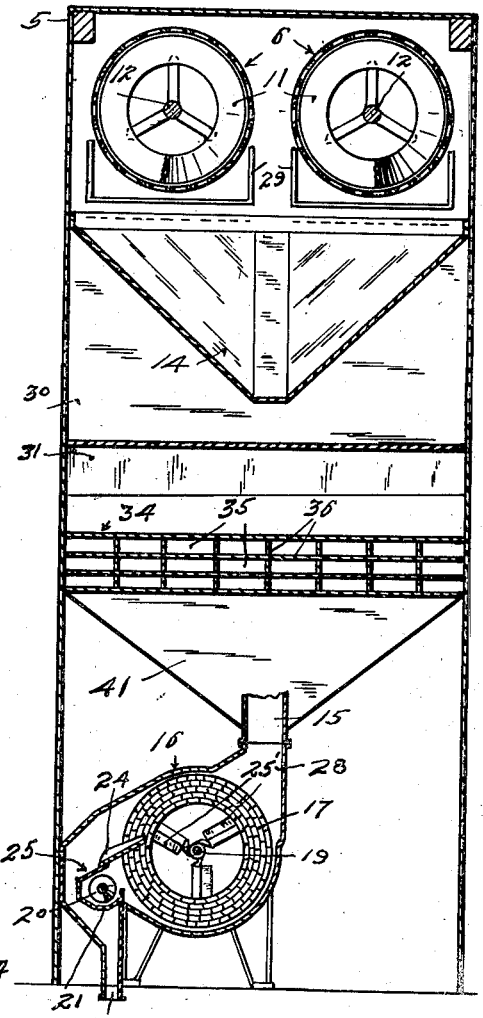
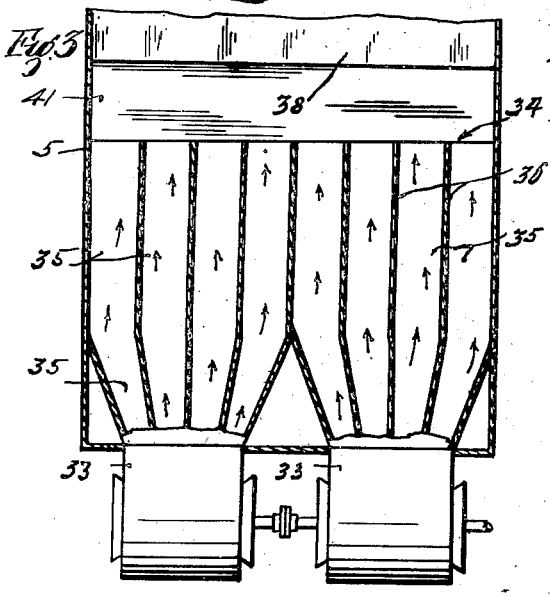
INVENTOR
Walter Earl Dempsey
By his Attorney
Harry W. Kilgore Sept. 17, 1946. W. E. DEMPSEY 2,407,653
GRAIN CLEANER
Filed Feb. 12, 1944 2 Sheets-Sheet 2

INVENTOR
Walter Earl Dempsey
By his Attorney
Harry D. Kilgore

Patented Sept. 17, 1946

2,407,653

UNITED STATES PATENT OFFICE 2,407,653

GRAIN CLEANER

Walter Earl Dempsey, Moose Jaw, Saskatchewan, Canada

Application February 12, 1944, Serial No. 522,165

1 Claim. (Cl. 209—12)

This invention relates to improvements in grain cleaners.

All grains, after threshing, have mixed with them a certain percentage of weed seeds and sometimes a certain percentage of other cereal grains. This mixture is well known to be undesirable and various devices have long been used to clean and segregate them.

The present invention results from the recognition of the following facts: That, though the weed seeds with which cereal grains are normally mixed are not all lighter in weight than the smaller of these grains, they are in all or substantially all cases lighter in weight than any of the normal grains, as opposed to the undersized grains, and these weed seeds can be removed substantially completely from the normal grains without the loss of the small but valuable grains, provided a transverse-diameter division of a stream of grain is first made by passing it over a screen with longitudinal openings and only that division containing the normal grains is subject to the action of a deturbulized air winnower, rather than subjecting the whole grain stream to the action of an air blast as has long been the custom; that, owing to the greater disparity between the length of undersized grains and smaller weed seeds as opposed to undersized grains and larger weed seeds, the loss of undersized but sound grains in a disc-separator is avoided when the larger weed seeds are first segregated from the undersized grains and smaller weed seeds by making a transverse-diameter division of a stream of grain by passing it over a screen with longitudinal openings, and only that division that contains the undersized grains and the smaller weed seeds is fed through the disc-separator, rather than feeding the whole stream of grain through said separator, as has long been the custom, and losing the undersized but sound grains in removing the larger weed seeds.

A more satisfactory and economical specific gravity segregation of a vertically falling stream of grain and/or weed seeds can be made when a non-turbulent current of high-velocity air, produced by an impeller type fan in combination with an air chamber equipped with turbulence-removing vanes and having a rectangular-horizontal throat through which a current of non-turbulent air is directed, is applied horizontally to it than when, as has long been the custom, a current of turbulent air is applied vertically, either under-blast or suction, because of the turbulence of the air and because of greater particle interference and because of greater deflection of the applied air.

The objects of this invention are: first, to divide a mixture of grain and weed seeds into two fractions by means of a transverse-diameter division to segregate undersized grains and small weed seeds and normal grains and larger weed seeds; second, to convey the fraction containing undersized grains and smaller weed seeds to a disc-separator to remove the weed seeds from the grains; third, in passing the fraction containing normal grains and large weed seeds through a winnower and subjecting it to the action of a non-turbulent current of high velocity air to remove the weed seeds; fourth, to convey normal grains, weed seeds and/or grains of a greater length than the desired grains from the winnower to either a disc-separator or distant point; and fifth, to provide a baffle board in the winnower for intercepting desired materials and returning the same to the stream being conveyed from the winnower.

Other objects of the invention will be apparent from the following description, reference being had to the accompanying drawings.

To the above end, generally stated, the invention consists of the novel devices and combinations of devices hereinafter described and defined in the claim.

In the accompanying drawings, which illustrate one embodiment of the invention, like characters indicate like parts throughout the several views.

Referring to the drawings:

Fig. 1 is a front end elevation of the improved grain cleaner;

Fig. 2 is a view principally in transverse vertical section taken on the irregular line 2—2 of Fig 4;

Fig. 3 is a fragmentary view principally in horizontal section taken on the irregular line 3—3 of Fig. 4.

Figure 4:
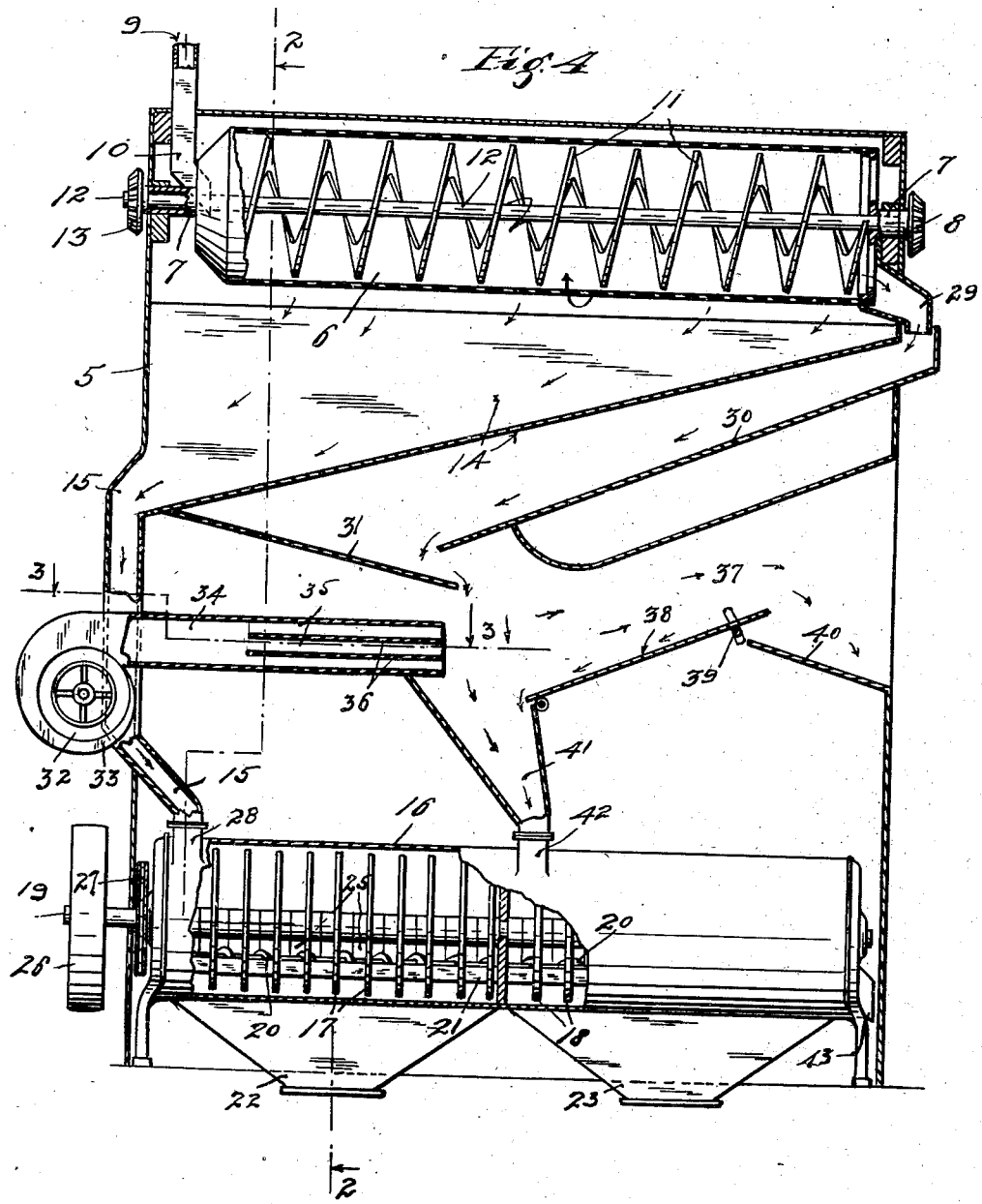
Fig. 4 is a view partly in elevation and partly in longitudinal vertical section taken substantially centrally through the grain cleaner.

The numeral 5 indicates a rectilinear housing, in the upper portion of which are suspended two horizontally disposed cylindrical rotatable screens 6. These two screens 6 are parallel, lie in the same horizontal plane and have longitudinal openings of a width at least substantially as great as the transverse diameter of the smallest of normal grains which it is desired to recover. Tubular trunnions 7 on the ends of the screens 6 are journaled in bearings on the housing 5. A driven bevel gear 8 is mounted on the trunnion 7 of each screen 6 at its tail-end outwardly of the housing 5. An upright spout 9 leading from any suitable source of grain mixture supply, not shown, to be cleaned, terminates at its lower end in two branch spouts 10 arranged to discharge streams of grain mixture into the screens 6. If desirable, the screens 6 may be provided with brushes or other cleaning devices, not shown.

A spiral conveyor 11 in each screen 6 is carried on a shaft 12 journaled in the respective tubular trunnions 7. Each shaft 12 at the receiving end of the respective screen 6 and outwardly of the housing 5 is provided with a driven bevel gear 13. The conveyors 11 are rotated in opposite directions from the direction of rotation of the screens 6, as shown by the arrows marked on Fig. 4. The conveyors 11 are provided for passing a grain mixture over the screens 6 to divide the same into two fractions by transverse-diameter division, one of which, the "overs" is composed of grains and weed seeds of larger diameter and the other of which, the "thrus" is composed of grains and weed seeds of smaller diameter. The "thrus" are precipitated onto an inclined deck 14 that is V-shape in cross-section. This deck 14 is inclined in a direction to convey the "thrus" in the opposite direction from their movement longitudinally in the screens 6. The "thrus" from the two screens 6 are united on the deck 14 and conveyed thereby to an upright spout 15 that leads to the head-end of a disc-separator of a well known type.

The disc-separator includes a horizontally disposed drum 16, two series of revolving pocketed discs 17 and 18 in the head-end section and the tail-end section of the drum 16, respectively. These discs 17 and 18 are mounted on a common shaft 19 journaled in bearings in the ends of the drum 16. The disc-separator further includes a screw conveyor 20 that works in a trough 21 in the drum 16 at the downwardly moving edges of the discs 17 and 18 and below the shaft 19. Below the trough 21 are two open-bottom hoppers 22 and 23, the former being opposite the discs 17 and the latter opposite the discs 18. Materials picked up by the discs 17 and 18 are discharged into inclined troughs 24 between said discs and arranged to discharge materials therein either into the trough 21 or onto inclined trap doors 25. The trap doors 25, when closed, cover the trough 21 and material deposited thereon from the troughs 24 is directed into the hoppers 22 and 23. A pulley 26 driven by any suitable source of power is mounted on the shaft of the screw conveyor at the head-end of the drum 16. The screw conveyor 20 is driven from the shaft 19 by a sprocket chain arranged to run over aligned sprocket wheels on said shaft and the shaft of the screw conveyor 20, as indicated as an entirety by the numeral 27.

The spout 15 at its lower end is connected to a short spout 28 on the drum 16 at its head-end.

Normal grains and the larger weed seeds, from which the "thrus" have been removed, are fed through the outlet ends of the screens 6 by the conveyors 11 and into short spouts 29 arranged to discharge the "overs" onto a flat inclined deck 30 which extends substantially parallel to the bottom of the V-shaped deck 14. The "overs" from the two screens 6 are united on the deck 30 and precipitated onto a reversely inclined deck 31 which projects under the deck 30. From the inclined deck 31 the "overs" fall in the form of a curtain through a deturbulized air winnower. This winnower includes one or more laterally spaced impeller-type fans 32 that operate in the same vertical plane. These fans 32 are driven, synchronously, at controlled variable speeds, by any well known means and, for the purpose of this case, it is not thought necessary to illustrate the same. The fans 32 are mounted in a housing 33 directly above the head-end of the disc-separator. Continuing in front of the fan housing 33 is a housing 34 for an air chamber. The top and bottom members of the housing 33 form a rectangular-horizontal throat through which a high-velocity current of non-turbulent air from the fans 32 is directed. To prevent turbulence of air through the air chamber 34, said chamber is divided into a plurality of passageways 35 by vertical and horizontal vanes or partition members 36. It is in front of the throat of the air chamber 34 that the "overs" from the deck 31 are precipitated. The several streams of air from the fan 32 passing through the "overs" carry with them the weed seeds and convey the same into a passageway 37. In the bottom of the passageway 37 is an adjustable inclined baffle board 38. This baffle board 38 is pivoted at its lower end and its upper end is adjustably held by a rod 39 which extends through slots in the sides of the housing 5 and a co-operating nut or any other well known manner, not shown. According to inclination of the baffle board, any desired volume will strike the baffle board 38 and slide downwardly thereon and into the falling stream of "overs" and be reunited therewith. The weed seeds will be carried over the baffle board 38 and fall from the spent air current and be precipitated onto a downwardly inclined deck 40 and be carried thereon outside of the housing 5 where they may be collected in any suitable way. "Overs" after passing the winnower enter a spout 41 connected at its lower end to a short spout 42 on the drum 16 at the head-end of the discs 18 where they may either be handled by discs 18 or conveyed directly into discharge hopper 23.

The "thrus" are fed from the spout 28 into the drum 16 and the revolving discs 17 will segregate the grain from weed seeds as both are being conveyed by propellor blades 25' toward the other end of the drum 16. The discs 17 have pockets of a size and shape that will pick up and discharge weed seeds into the respective inclined troughs 24 where they escape over the closed trap doors 25 into the hopper 22, propellor blades 25' conveying the grain and/or the long slender weed seeds to discs 18 where they are segregated in a manner hereinafter outlined.

The desired "overs" from the winnower can be fed either directly into hopper 23 or, if further cleaning is thought necessary, into drum 16 through spout 42 and the revolving discs 18 will segregate the grain from the weed seeds as both are being conveyed toward the other end of the drum 16 by propellor blades 25'. The discs 18 have pockets of a size and shape that will pick up the desired grains and discharge the same into the respective trough 24 where they will escape over the closed trap doors 25 into the hopper 23.

Weed seeds and/or grain of a greater length than the desired grains are conveyed by the conveyor 25' to a discharge port 43 in the tail-end of the drum 16. If, however, the "overs" are substantially free of weed seeds, as will mostly be the case, they may be discharged directly into the hopper 23. The improved apparatus also has an additional advantage over those heretofore described and that is, if grain without any undersized fraction is desired, it is ready to hand before the fraction containing the undersized grain is reunited therewith.

While the openings in the screens 6 should be at least wide enough to let all undersized grains of the type to be separated fall through said screens, they may, for example, in cases where the normal grains to be separated are of a light-weight type or the larger seeds are particularly heavy, be made even wider than this so as to allow small normal grains of the desired type to fall through and be treated in the disc-separator and thus prevent their loss in the winnower. There will, naturally, be no advantage in making the openings of the screen 6 any wider than is necessary to insure a sufficiently clean separation, by the winnower, of seeds which pass over the screens 6 with the larger grains, and in many cases the separation can be made substantially at the line of division between normal and undersized grains.

It may be well to state here that normal grains of the different cereals in question are generally within the following limits of size: Red spring wheat $5.5/64''-8.5/64''$ in diameter; durum wheat, $6.5/64''-9/64''$; winter wheat, $6/64''-9/64''$; oats, $5/64''-7.5/64''$; two row barley, $7/64''-10/64''$; six row barley, $6/64-9/64''$; rye, $5/64''-7/64''$.

The spacing of the wires in the screen depends on the diameter of the normal grains of the type to be separated and also to some extent on the kind of admixed weed seeds to be removed. Thus in the case of spring wheat the spacing would be generally about $5.5/64''$. Generally it is preferable to provide the apparatus with five screens or sets of screens in which the wires are spaced $5/64$, $5.5/64$, $6/64$, $6.5/64$ and $7/64$ of an inch apart, respectively. It is then easy by comparatively simple trial and error to determine which screen or set of screens is best suited for the separation of the grain which is being fed to the apparatus. Generally speaking, it will be found satisfactory to use a screen in which the spacing of the wires corresponds to the minimum diameter of the normal grain to be treated, thus, the screen with the smallest spacing for oats and rye, with the next largest spacing for spring wheat, and so on. By way of example, it may be stated that the weed seeds which might be expected to be present in cereal grains are wild oats, stink weed, yellow mustard, ball mustard, pigweed, cockle, wild buckwheat and ragweed. In treating wheat with the apparatus and using a screen in which the wires are spaced $5.5/64$ of an inch apart, practically all of the seeds of the first five types go through the screen with the smaller grains, while all except the undersized seeds of the last three types go over the screen with the larger grains.

From the foregoing it must be evident that the invention herein disclosed is capable of a large range of modifications within the spirit of the invention herein disclosed and claimed.

What I claim is:

A grain cleaner for removing weed seeds from cereal grains comprising a plurality of duplicate rotatable screens with longitudinal openings of a width at least substantially as great as the diameter of the smallest normal grain to be recovered, means for feeding a mixture of grains and weed seeds into each screen to divide the same in each screen into two fractions, by transverse-diameter division, one of which, the "overs," is composed of grains and weed seeds of larger diameter and the other of which, the "thrus," is composed of grains and weed seeds of smaller diameter, a rotatable spiral conveyor in each screen, means for rotating each conveyor in the opposite direction from the direction of rotation of the screen to pass the mixture therein over the screen, a winnower, means for uniting the "overs" from the several screens and feeding the same through the winnower, a baffle board constructed and arranged to control the specific gravity division made in the winnower and reunite the material coming off the baffle board with the parent stream of "overs" gravitated through the winnower, a disc-separator, means for feeding the main stream "overs" from the winnower through the disc-separator, means for uniting the "thrus" from the several screens and feeding the same through the disc-separator, and means for reuniting the "thrus" and "overs" containing the desired grains after their separate treatment.

WALTER EARL DEMPSEY.